UNITED STATES PATENT OFFICE.

GOTTLIEB DÄNDLIKER, OF LUDWIGSHAFEN-ON-THE-RHINE, BAVARIA, AND HEINRICH AUGUST BERNTHSEN, OF MANNHEIM, BADEN, GERMANY, ASSIGNORS TO THE BADISCHE ANILIN AND SODA FABRIK, OF MANNHEIM, GERMANY.

MANUFACTURE OF TOLUIDINE-BLUE.

SPECIFICATION forming part of Letters Patent No. 416,055, dated November 26, 1889.

Application filed June 8, 1889. Serial No. 313,607. (Specimens.)

*To all whom it may concern:*

Be it known that we, GOTTLIEB DÄNDLIKER, a citizen of the Swiss Republic, residing at Ludwigshafen-on-the-Rhine, in the Kingdom of Bavaria, Empire of Germany, and HEINRICH AUGUST BERNTHSEN, doctor of philosophy, a subject of the King of Prussia, residing at Mannheim, in the Grand Duchy of Baden, Empire of Germany, have invented new and useful Improvements in the Manufacture of Toluidine-Blue, of which the following is a specification.

Our invention relates to the manufacture of a blue dye-stuff or coloring-matter allied to methylene-blue, which we term "toluidine-blue," on account of the ortho-toluidine entering as an essential constituent into its molecule in lieu of dimethylaniline, which is employed in an analogous manner in the synthetical production of methylene-blue.

In carrying out our invention we take about six parts, by weight, of dimethylaniline, which we dissolve in about eighteen parts, by weight, of hydrochloric acid of about 1.16 specific gravity, and then we gradually add a solution of about three and eight-tenths parts, by weight, of nitrite of soda in about six parts, by weight, of water. The hydrochlorate of nitroso-dimethylaniline thus produced in the well-known manner is then submitted to the reducing action of zinc-dust by adding, first, about thirty parts, by weight, of hydrochloric acid of about 1.16 specific gravity, and then (in small portions at a time) about ten parts, by weight, of zinc-dust, as is well understood by chemists. The solution of hydrochlorate of paramido-dimethylaniline thus obtained (as is well known) is afterward diluted with about two hundred and fifty parts, by weight, of water, and then the uncombined hydrochloric acid contained in said solution is, if any, neutralized by the addition of an alkali. There are then added about sixteen parts, by weight, of sulphate of alumina and about thirteen parts, by weight, of thiosulphate of sodium, (hyposulphite of soda,) and immediately afterward a solution of about five parts, by weight, of bichromate of potash in about sixty parts, by weight, of water is quickly run in. In this stage of the process the formation of an acid sulphureted compound of paramido-dimethylaniline takes place, possessing the formula $C_8H_{11}N_2S.SO_3H$, which we term "paramido-dimethylaniline-thiosulphonic acid." Without previous separation of this intermediate compound a solution of about five and three-tenths parts, by weight, of ortho-toluidine, in the requisite amount of dilute hydrochloric acid, (say about six parts, by weight, of hydrochloric acid of about 1.16 specific gravity diluted with about six parts, by weight, of water,) and shortly afterward a solution of about fourteen parts, by weight, of bichromate of potash in about one hundred and sixty parts, by weight, of water is then added under constant agitation, when a precipitate will be formed chiefly consisting of a green indamine possessing in its dry condition the formula $C_{15}H_{17}N_3S_2O_3$. In order to transform the same into toluidine-blue, about fifty parts, by weight, of a solution of chloride of zinc of about 1.5 specific gravity are added, and the mixture thus obtained is boiled during about half an hour, when, after cooling, the toluidine-blue thus formed will separate out and may then be filtered and purified, if necessary, by repeated solution in water and precipitation by means of chloride of sodium and chloride of zinc.

In the above-described process the sulphate of alumina may be dispensed with and replaced by as much hydrochloric, sulphuric, or acetic acid as will be required to liberate the thiosulphuric acid from the thiosulphate of sodium employed.

Toluidine-blue prepared as above described presents the following characteristic properties: It consists principally of the hydrochlorate of dimethyltoluthionine, the composition of which corresponds to the formula $C_{15}H_{15}N_3S.HCl$. It is easily soluble in water, the solution possessing a violet-blue color, which is of a redder tint than that of methylene-blue. It resembles the latter in its general properties, and may be also employed in dyeing and printing in a similar manner.

Toluidine-blue may be readily distinguished from methylene-blue by the redder tint of the colors which it is capable of producing in dyeing and printing. The colors resist the steaming process, whereas the analogous thionine colors produced from aniline in lieu of ortho-toluidine turn gray in steaming. It can be easily extracted by means of ether or chloroform from its aqueous solutions, after rendering the same alkaline by the addition of carbonate of soda, whereas methylene-blue treated in a similar manner refuses to dissolve in the said solvents. Chloride of mercury, potassium iodide, and potassium bichromate precipitate the aqueous solution. The precipitates are of blackish-purple shade.

What we claim as new, and desire to secure by Letters Patent, is—

1. As a new product, the coloring-matter or dye-stuff (toluidine-blue) hereinbefore described, which consists principally of the hydrochlorate of dimethyltoluthionine, $C_{15}H_{16}N_3S.Cl$, and which appears in the form of a brown or blackish green powder or of small green crystals, dissolves easily in water with a violet-blue color, which is of a redder tint than that of the methylene-blue, and is soluble in alcohol with a blue color, but insoluble in benzine.

2. The process of producing the new coloring-matter or dye-stuff (toluidine-blue) hereinbefore described, which consists in converting dimethylaniline into nitroso, then into paramido-dimethylaniline, submitting this diamine, in mixture with sodium hyposulphite, to the action of an oxidizing agent in order to transform it into paramido-dimethylaniline-thiosulphonic acid, $C_8H_{11}N_2S.SO_3H$, then producing by addition of ortho-toluidine and of an oxidizing agent a green indamine possessing the formula $C_{15}H_{17}N_3S_2O_3$, and finally converting this green indamine into toluidine-blue by heating it with a solution of zinc chloride in the presence of an oxidizing agent.

In testimony whereof we have hereunto set our hands in the presence of two subscribing witnesses.

GOTTLIEB DÄNDLIKER.
HEINRICH AUGUST BERNTHSEN.

Witnesses:
CARL HOFFMANN,
HERM. HAUG.